(12) United States Patent
Cao et al.

(10) Patent No.: US 9,176,352 B2
(45) Date of Patent: Nov. 3, 2015

(54) TFT-LCD ARRAY SUBSTRATE, MANUFACTURING METHOD, DETECTING METHOD AND DRIVING METHOD

(75) Inventors: Kun Cao, Beijing (CN); Yuhua Li, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 690 days.

(21) Appl. No.: 12/887,710

(22) Filed: Sep. 22, 2010

(65) Prior Publication Data
US 2011/0069048 A1   Mar. 24, 2011

(30) Foreign Application Priority Data
Sep. 24, 2009   (CN) ............................ 200910093486

(51) Int. Cl.
| G02F 1/1362 | (2006.01) |
| G09G 3/36 | (2006.01) |
| G02F 1/13 | (2006.01) |
| G02F 1/1333 | (2006.01) |

(52) U.S. Cl.
CPC ........ *G02F 1/136286* (2013.01); *G02F 1/1309* (2013.01); *G09G 3/3648* (2013.01); *G02F 1/13624* (2013.01); *G02F 2001/133397* (2013.01); *G02F 2001/136254* (2013.01); *G09G 3/367* (2013.01); *G09G 3/3659* (2013.01); *G09G 3/3696* (2013.01); *G09G 2300/0426* (2013.01); *G09G 2300/0443* (2013.01); *G09G 2310/0262* (2013.01); *G09G 2320/0204* (2013.01); *G09G 2320/0257* (2013.01)

(58) Field of Classification Search
CPC ... G09G 3/3648; G09G 3/367; G09G 3/3696; G09G 3/3659
USPC ............................................... 345/204, 92, 34
See application file for complete search history.

(56) References Cited

U.S. PATENT DOCUMENTS

| 6,774,396 B1 * | 8/2004 | Chang et al. ..................... 257/59 |
| 2004/0147058 A1 | 7/2004 | Shih |
| 2007/0018926 A1 | 1/2007 | Shin et al. |
| 2007/0164937 A1 * | 7/2007 | Jung et al. ....................... 345/76 |
| 2008/0001937 A1 * | 1/2008 | Shin et al. ..................... 345/204 |

(Continued)

FOREIGN PATENT DOCUMENTS

| CN | 101510037 A | 8/2009 |
| JP | 2002-289824 A | 10/2002 |

(Continued)

*Primary Examiner* — Kent Chang
*Assistant Examiner* — Chayce Bibbee
(74) *Attorney, Agent, or Firm* — Ladas & Parry LLP (57) ABSTRACT

An array substrate is provided. The array substrate comprises: a first gate line and a second gate line parallel to each other; a data line, and a detecting line. The first gate line and the second gate line intersect with the data line to define a pixel region, a pixel electrode, a first thin film transistor and a second thin film transistor are provided in the pixel region. The first thin film transistor is respectively connected with the first gate line, the data line and the pixel electrode, and the data line can be electrically connected with the pixel electrode by controlling the first gate line. The second thin film transistor is respectively connected with the second gate line, the detecting line and the pixel electrode, and the pixel electrode can be electrically connected with the detecting line by controlling the second gate line.

15 Claims, 5 Drawing Sheets

(56) References Cited

U.S. PATENT DOCUMENTS

2009/0195489 A1* 8/2009 Hung et al. .................. 345/92
2010/0060558 A1* 3/2010 Kim et al. ................... 345/87

FOREIGN PATENT DOCUMENTS

| JP | 2005-123438 A | 5/2005 |
|----|---------------|--------|
| KR | 20070010618 A | 1/2007 |

* cited by examiner

TFT-LCD ARRAY SUBSTRATE, MANUFACTURING METHOD, DETECTING METHOD AND DRIVING METHOD

BACKGROUND

Embodiments of the present invention relate to a thin film transistor liquid crystal display (TFT-LCD) array substrate, a manufacturing method thereof, a detecting method thereof and a driving method thereof.

A thin film transistor liquid crystal display (TFT-LCD) mainly comprises an array substrate, a color filter substrate and a liquid crystal layer sandwiched between the array substrate and the color filter substrate. Gate lines and data lines are formed on the array substrate. Thin film transistors and pixel electrodes are further formed on the array substrate in a matrix. A black matrix, color resin units and a common electrode are formed on the color filter substrate. The liquid crystal molecules in the liquid crystal layer are orientated under the control of the voltage difference between the pixel electrodes of the array substrate and the common electrode of the color filter substrate. Because of different orientation angles, the light passing through the pixel units varies, and thus different gray levels are represented to display the desirable image.

In manufacturing a TFT-LCD, it is necessary to detect the array substrate in order to secure the product quality. Currently, the TFT-LCD array substrate is detected for example by a simulation cell method. The detecting device employed in this method is a device that utilizes the photoelectric conversion phenomenon and mainly comprises a mirror for reflecting light and a liquid crystal layer provided above the mirror. In detecting, the TFT-LCD array substrate is placed below the mirror with a distance of 12 μm to 20 μm and data signals are inputted into the array substrate. With the cooperation of an imaging system, the detection of the array substrate is accomplished by utilizing the phenomenon that the liquid crystal molecules deflect with the variation of the electric field and by utilizing the photoelectric conversion phenomenon. However, the above detecting device is complex and expensive, and the above detecting method is not flexible enough.

In addition, image sticking is one of the severe problems to be taken care of in a TFT-LCD. During the operation of a TFT-LCD, charges may be accumulated in the alignment layers provided on both sides of the liquid crystal layer and in other micro-structures. The accumulated charges result in an additional voltage difference between the pixel electrode and the common electrode. Thus, the liquid crystal molecules deflect under the additional voltage difference even though no data signal is applied, and in this case, optical rotation effect occurs and image sticking is generated. In addition, when a same image is displayed for a long time period, the liquid crystal molecules are easily to be polarized, and in this case, optical rotation effect also occurs due to the polarized liquid crystal molecules and image sticking is generated as well. Currently, diversifying the materials employed in a TFT-LCD is one of the methods to overcome the defect of image sticking; however, the defect of image sticking cannot be completely eliminated.

SUMMARY

According to an aspect of the invention, an array substrate is provided. The array substrate comprises: a first gate line and a second gate line parallel to each other; a data line, and a detecting line, wherein the first gate line and the second gate line intersect with the data line to define a pixel region, and a pixel electrode, a first thin film transistor and a second thin film transistor are provided in the pixel region; wherein the first thin film transistor is connected with the first gate line, the data line and the pixel electrode, and the data line is capable of being electrically connected with the pixel electrode under control of the first gate line; and wherein the second thin film transistor is connected with the second gate line, the detecting line and the pixel electrode, and the pixel electrode is capable of being electrically connected with the detecting line under control of the second gate line.

According to another aspect of the invention, a method of manufacturing an array substrate is provided. The method comprises: forming a first gate line, a second gate line, a first gate electrode and a second gate electrode, wherein the first gate electrode is connected with the first gate line, and the second gate electrode is connected with the second gate line; forming a first active layer, a second active layer, a data line, a first source electrode, a first drain electrode, a second source electrode and a second drain electrode; forming a first via hole, a second via hole and a third via hole, wherein the first via hole is provided at the first drain electrode, the second via hole is provided at the second drain electrode and the third via hole is provided at the second source electrode; forming a pixel electrode and a detecting line, wherein the pixel electrode is connected with the first drain electrode through the first via hole and connected with the second drain electrode through the second via hole, and the detecting line is connected with the second source electrode through the third via hole.

According still another aspect of the invention, a method of detecting the array substrate is provided. The method comprises: supplying an ON or OFF voltage to the first gate line and/or the second gate line; and determining whether the thin film transistors normally operate according to connection state between the data line and the detecting line.

According to still another aspect of the invention, a method of driving the array substrate is provided. According to this method, an ON signal is supplied to the second gate line before an ON signal is supplied to the first gate line so that the detecting line is electrically connected with the pixel electrode to eliminate image sticking defect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Hereinafter, embodiments of the invention will be described in detail with reference to the accompanying drawings. It should be noted that, the accompanying drawings give out schematic views, and thus the shapes and sizes of the TFT-LCD array substrate shown in the accompanying drawings are not actual scale.

Figure 1:
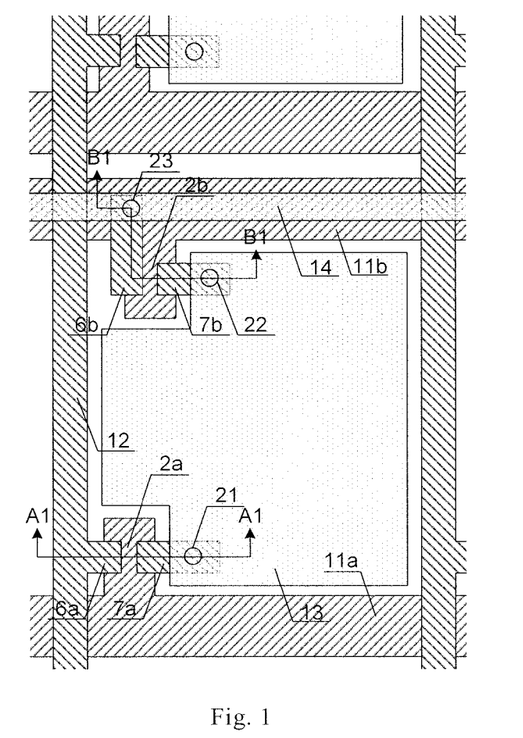
FIG. 1 is a plan view showing a TFT-LCD array substrate according to an embodiment.
Figure 2:
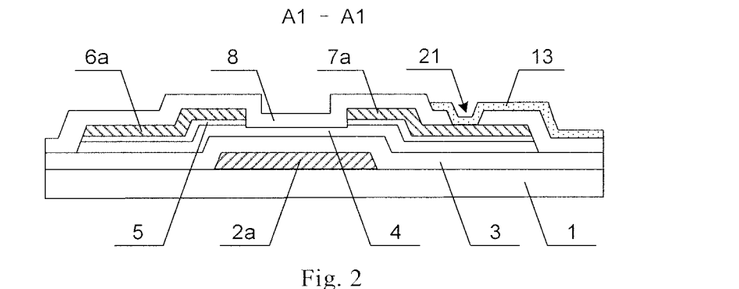
FIG. 2 is a sectional view taken along line A1-A1 in FIG. 1.
Figure 3:
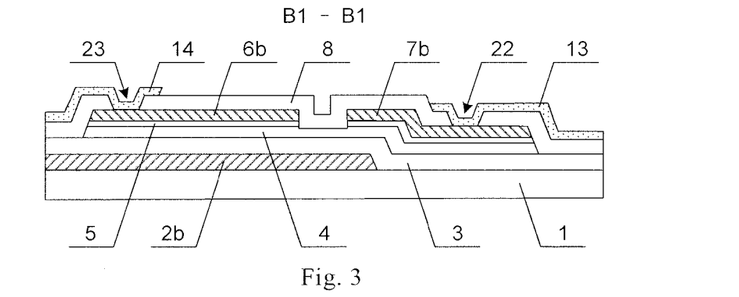
FIG. 3 is a sectional view taken along line B1-B1 in FIG. 1.

FIG. 1 is a plan view showing a TFT-LCD array substrate according to an embodiment, FIG. 2 is a sectional view taken along line A1-A1 in FIG. 1, and FIG. 3 is a sectional view taken along line B1-B1 in FIG. 1.

As shown in FIG. 1 to FIG. 3, the TFT-LCD array substrate in this embodiment mainly comprises a plurality of first gate lines 11a, a plurality of second gate lines 11b, a plurality of data lines 12 and a plurality of detecting lines 14 on the substrate. The first gate lines 11a and the second gate lines 11b are alternatively provided and parallel to each other. The detecting lines 14 are provided above the second gate lines 11b. The first gate lines 11a and the second gate lines 11b intersect with the data lines 12 to define a plurality of pixel regions that are arranged in a matrix. In each of the pixel regions, a first thin film transistor, a second thin film transistor and a pixel electrode 13 are provided. The first thin film transistor is connected with the first gate line 11a, the data line 12 and the pixel electrode 13. The first thin film transistor is used to control the supply of data signals to the pixel electrode 13. The second thin film transistor is connected with the second gate line 11b, the detecting line 14 and the pixel electrode 13. The above structure can be used to detect whether the thin film transistors normally operate and the characteristics of the thin film transistors, and can further be used to eliminate and the image sticking defect.

The first thin film transistor comprises a first gate electrode 2a, a first active layer, a first source electrode 6a and a first drain electrode 7a. The second thin film transistor comprises a second gate electrode 2b, a second active layer, a second source electrode 6b and a second drain electrode 7b. The first gate line 11a, the second gate line 11b, the first gate electrode 2a and the second gate electrode 2b are formed on the base substrate 1. The first gate electrode 2a is connected with the first gate line 11a, and the second gate electrode 2b is connected with the second gate line 11b. A gate insulating layer 3 is formed on the first gate line 11a, the second gate line 11b, the first gate electrode 2a and the second gate electrode 2b and covers the entirety of the base substrate 1. The first active layer (comprising the laminate of a semiconductor layer 4 and a doped semiconductor layer 5) is formed on the gate insulating layer 3 and provided above the first gate electrode 2a. The first source electrode 6a and the first drain electrode 7a are formed on the first active layer. One end of the first source electrode 6a is provided above the first gate electrode 2a, and the other end thereof is connected with the date line 12. One end of the first drain electrode 7a is provided above the first gate electrode 2a, and the other end thereof is connected with the pixel electrode 13. A first TFT channel region is formed between the first source electrode 6a and the first drain electrode 7a. In the first TFT channel region, the doped semiconductor layer 5 is etched away and the semiconductor layer 4 is partially etched in the thickness direction thereof so that the semiconductor layer 4 is exposed in this region. The second active layer 4 (also comprising the semiconductor layer 4 and the doped semiconductor layer 5) is formed on the gate insulating layer 3 and provided above the second gate electrode 2b. The second source electrode 6b and the second drain electrode 7b are formed on the second active layer. One end of the second source electrode 6b is provided above the second gate electrode 2b, and the other end thereof is connected with the detecting line 14. One end of the second drain electrode 7b is provided above the second gate electrode 2b, and the other end thereof is connected with the pixel electrode 13. A second TFT channel region is formed between the second source electrode 6b and the second drain electrode 7b. In the second TFT channel region, the doped semiconductor layer 5 is etched away and the semiconductor layer 4 is partially etched in the thickness direction thereof so that the semiconductor layer 4 is exposed in this region. A passivation layer 8 is formed on the above patterns. A first via hole 21, a second via hole 22 and a third via hole 23 are formed in the passivation layer 8. The first via hole 21 is provided at the first drain electrode 7a, the second via hole 22 is provided at the second drain electrode 7b, and the third via hole 23 is provided at the second source electrode 6b. The pixel electrode 13 and the detecting line 14 are formed on the passivation layer 8. The pixel electrode 13 is formed within each of the pixel regions. The pixel electrode 13 is connected with the first drain electrode 7a through the first via hole 21, and connected with the second drain electrode 7b through the second via hole 22. The detecting line 14 is formed above the second gate line 11b and connected with the second source electrode 6b through the third via hole 23.

FIG. 4 to FIG. 12 are schematic views showing the manufacture process of the TFT-LCD array substrate according to the embodiment. In the following descriptions, the employed patterning process comprises applying a photoresist layer, masking, exposing and developing of photoresist, etching, removing remaining photoresist layer and the like, and positive type photoresist is used as an example of the photoresist.

Figure 4:
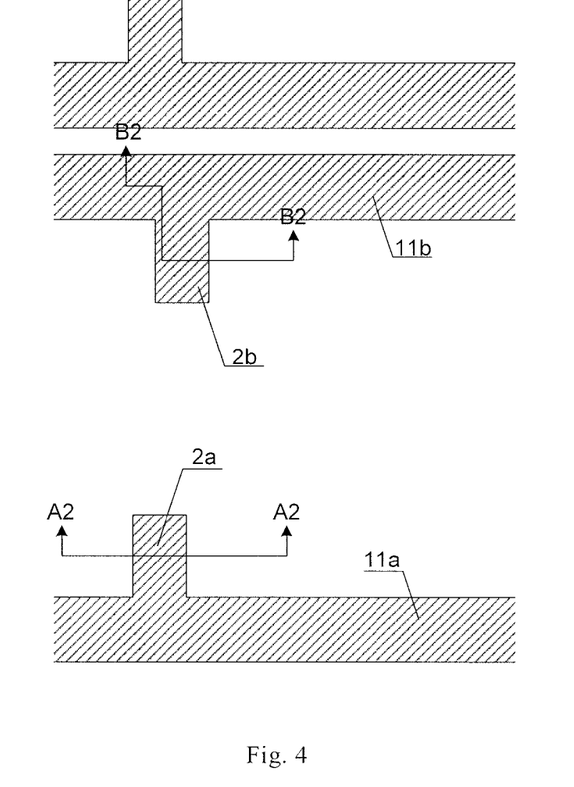
FIG. 4 is a plan view after a first patterning process of the TFT-LCD array substrate according to the embodiment.
Figure 5:
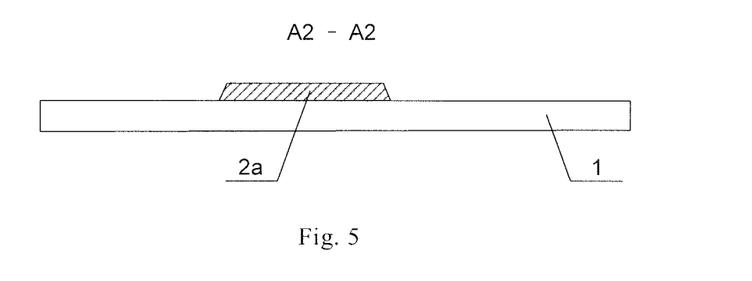
FIG. 5 is a sectional view taken along line A2-A2 in FIG. 4.
Figure 6:
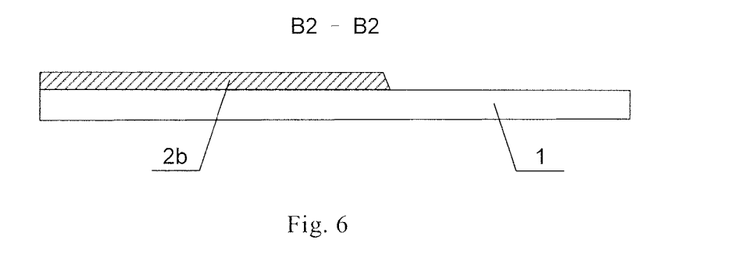
FIG. 6 is a sectional view taken along line B2-B2 in FIG. 4.

FIG. 4 is a plan view after a first patterning process of the TFT-LCD array substrate according to the embodiment, in which only one pixel region is shown. FIG. 5 is a sectional view taken along line A2-A2 in FIG. 4, and FIG. 6 is a sectional view taken along line B2-B2 in FIG. 4. Firstly, a gate metal film is deposited on the base substrate 1 (such as a glass substrate or a quartz substrate) by a magnetron sputtering method or a thermal evaporation method. The gate metal film may be a single-layer film of Cr, W, Ti, Ta, Mo, Al, Cu and the like or alloy thereof, or may be a multi-layer composite film of any combination of the above-described metals. The gate metal film is patterned by using a normal mask to form the first gate line 11a, the second gate line 11b, the first gate electrode 2a and the second gate electrode 2b on the base substrate, the first gate electrode 2a is connected with the first gate line 11a and the second gate electrode 2b is connected with the second gate line 11b, as shown in FIG. 4 to FIG. 6.

Figure 7:
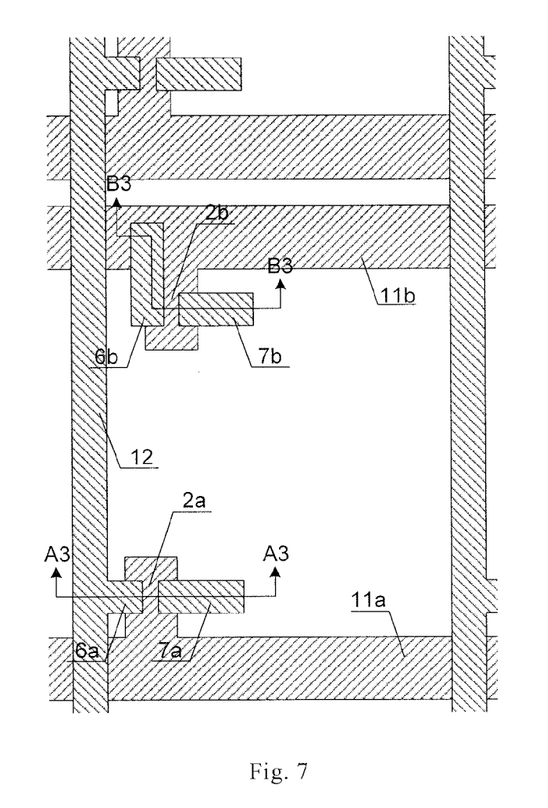
FIG. 7 is a plan view after a second patterning process of the TFT-LCD array substrate according to the embodiment.
Figure 8:
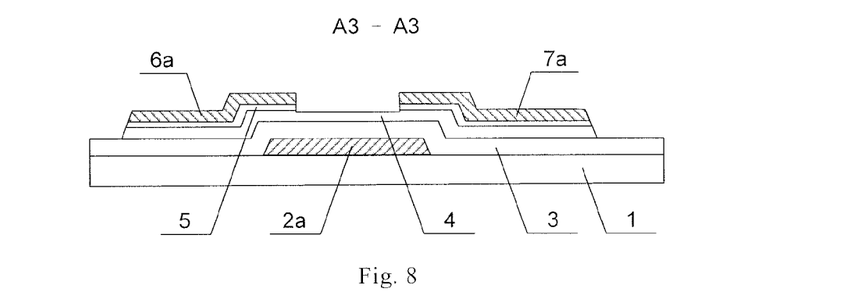
FIG. 8 is a sectional view taken along line A3-A3 in FIG. 4.
Figure 9:
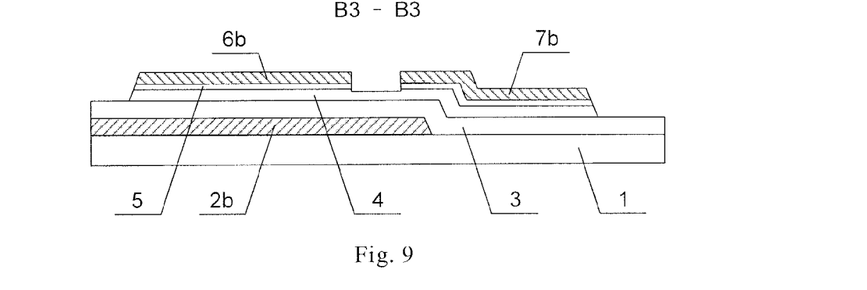
FIG. 9 is a sectional view taken along line B3-B3 in FIG. 4.

FIG. 7 is a plan view after a second patterning process of the TFT-LCD array substrate according to the embodiment, in which only one pixel region is shown. FIG. 8 is a sectional view taken along line A3-A3 in FIG. 4 and FIG. 9 is a sectional view taken along line B3-B3 in FIG. 4. On the base substrate with the pattern shown in FIG. 4, a gate insulating layer, a semiconductor film and a doped semiconductor film are sequentially deposited by a plasma enhanced chemical vapor deposition (PECVD) method, and then a source/drain metal film is deposited by a magnetron sputtering method or a thermal evaporation method. The gate insulating layer may be formed by oxide, nitride or oxynitride. The source/drain metal film may be a single-layer film of Cr, W, Ti, Ta, Mo, Al, Cu and the like or alloy thereof, or may be a multi-layer composite film of any combination of the above-described metals. Then, a patterning process is performed by using a half-tone mask or a gray-tone mask to form the first active layer, the second active layer, the data line 12, the first source electrode 6a, the first drain electrode 7a, the second source electrode 6b and the second drain electrode 7b, as shown in FIG. 7 to FIG. 9.

After the second patterning process, the first active layer (comprising the laminate of the semiconductor layer 4 and the doped semiconductor layer 5) is formed on the gate insulating layer 3 and provided above the first gate electrode 2a. The first source electrode 6a and the first drain electrode 7a are formed on the first active layer. One end of the first source electrode 6a is provided above the first gate electrode 2a, and the other end thereof is connected with the date line 12. One end of the first drain electrode 7a is provided above the first gate electrode 2a and opposite to the first source electrode 6a. The first TFT channel region is formed between the first source electrode 6a and the first drain electrode 7a. In the first TFT channel region, the doped semiconductor layer 5 is etched away and the semiconductor layer 4 is partially etched in the thickness direction thereof so that the semiconductor layer 4 is exposed in this region. The second active layer 4 (also comprising the laminate of the semiconductor layer 4 and the doped semiconductor layer 5) is formed on the gate insulating layer 3 and provided above the second gate electrode 2b. The second source electrode 6b and the second drain electrode 7b are formed on the second active layer. One end of the second source electrode 6b is provided above the second gate electrode 2b, and the other end thereof is provided above the second gate line 11b. One end of the second drain electrode 7b is provided above the second gate electrode 2b and opposite to the second source electrode 6b. The second TFT channel region is formed between the second source electrode 6b and the second drain electrode 7b. In the second TFT channel region, the doped semiconductor layer 5 is etched away and the semiconductor layer 4 is partially etched in the thickness direction thereof so that the semiconductor layer 4 is exposed in this region.

This patterning process may be a multiple-step etching process and the details thereof are described as follows. After the source/drain metal film is deposited, a photoresist layer is applied on the source/drain metal film. Next, the photoresist layer is exposed by using a half-tone mask or a gray-tone mask and then developed to form an unexposed region (i.e., a photoresist-completely-remained region), a completely exposed region (i.e., a photoresist-completely-removed region), and a partially exposed region C (i.e., a photoresist-partially-remained region). The unexposed region corresponds to the regions of the data line, the first source electrode, the first drain electrode, the second source electrode and the second drain electrode; the partially exposed region corresponds to the first TFT channel region and the second TFT channel region; and the completely exposed region corresponds to the region other than the above regions. The source/drain metal film, the doped semiconductor film and the semiconductor film in the completely exposed region are etched away by a first etching process to form the data line, the first active layer and the second active layer. Next, the photoresist layer in the partially exposed region is removed by an ashing process to expose the source/drain metal film in this region. By a second etching process, the source/drain metal film and the doped semiconductor film in the partially exposed region are etched away and the semiconductor film in this region is partially etched in the thickness direction thereof so that the semiconductor film is exposed, and thereby the first source electrode, the first drain electrode, the second source electrode, the second drain electrode, the first TFT channel region and the second TFT channel region are formed. Then, remaining photoresist layer is removed to complete the second patterning process of the TFT-LCD array substrate according to the embodiment. Since the data line, the first active layer and the second active layer are formed in the same patterning process, the semiconductor film and the doped semiconductor film are remained below the data line.

Figure 10:
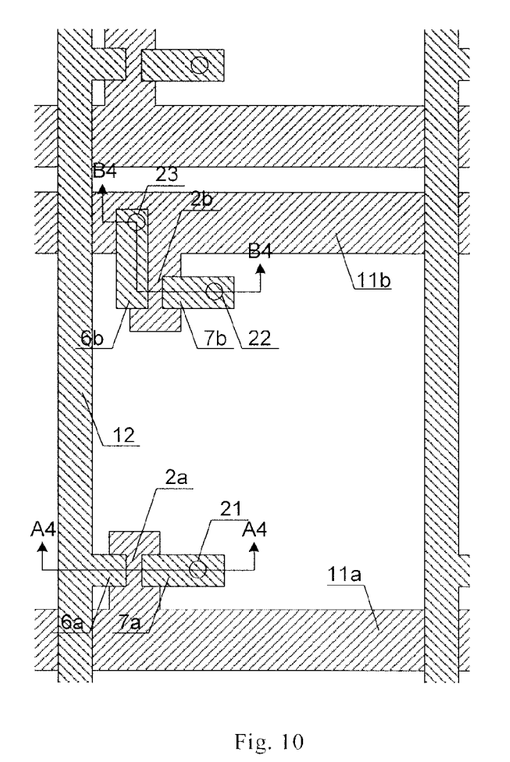
FIG. 10 is a plan view after a third patterning process of the TFT-LCD array substrate according to the embodiment.
Figure 11:
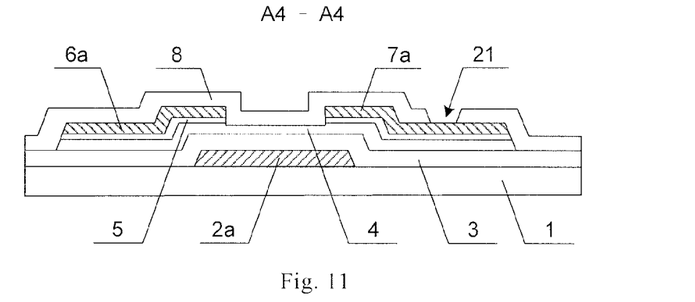
FIG. 11 is a sectional view taken along line A4-A4 in FIG. 10.
Figure 12:
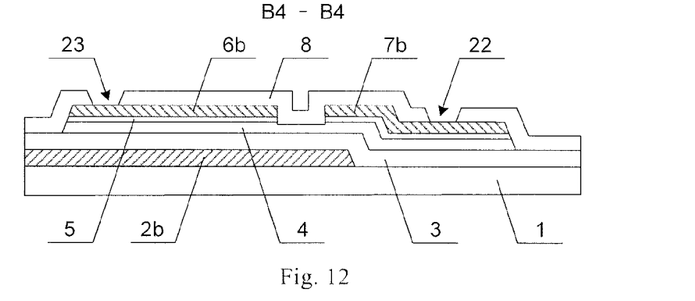
FIG. 12 is a sectional view taken along line B4-B4 in FIG. 10.

FIG. 10 is a plan view after a third patterning process of the TFT-LCD array substrate according to the embodiment, in which only one pixel region is shown. FIG. 11 is a sectional view taken along line A4-A4 in FIG. 10 and FIG. 12 is a sectional view taken along line B4-B4 in FIG. 10. On the base substrate with the pattern shown in FIG. 7, the passivation layer 8 is deposited by a PECVD method. The passivation layer 8 may be formed by oxide, nitride or oxynitride. Then, the passivation layer is patterned by using a normal mask to form the first via hole 21, the second via hole 22 and the third via hole 23, as shown in FIG. 10 to FIG. 12. The first via hole 21 is provided at the first drain electrode 7a, the second via hole 22 is provided at the second drain electrode 7b, and the third via hole 23 is provided at the second source electrode 6b. The passivation layer 8 within the first via hole 21, the second via hole 22 and the third via hole 23 is etched away so that the first drain electrode 7a, the second drain electrode 7b and the second source electrode 6b are exposed, respectively. In addition, in this patterning process, a gate pad via hole is formed at the gate pad region, and a data pad via hole is formed at the data pad region. The shapes and structures of the data pad via hole and the gate pad via hole are well-known to those in the relevant field, and the details thereof are omitted here for simplicity.

Finally, on the substrate with the above patterns, a transparent conductive film is deposited by a magnetron sputtering method or a thermal evaporation method. The transparent conductive film may be a single-layer film of indium tin oxide (ITO), indium zinc oxide (IZO), aluminum zinc oxide and the like, or a multi-layer composite film of any combination of the above metal oxides. In addition, the transparent conductive film may be formed of another metal or metal oxide. Then, the transparent conductive film is patterned to form the pixel electrode 13 and the detecting line 14, as shown in FIG. 1 to FIG. 3. The pixel electrode 13 is formed within the pixel region. The pixel electrode 13 is connected with the first drain electrode 7a through the first via hole 21 and connected with the second drain electrode 7b through the second via hole 22. The detecting line 14 is formed above the second gate line 11b and connected with the second source electrode 6b through the third via hole 23.

It should be noted that, the above manufacture process is only an example for manufacturing the TFT-LCD array substrate in this embodiment, and the TFT-LCD array substrate in this embodiment can be manufactured by increasing the number of the patterning process and selecting different materials or material combinations. For example, the patterns formed in the above-described second patterning process may be obtained by two patterning processes, that is, the first active layer and the second active layer are separately formed by a patterning process with a normal mask, and the data line, the first source electrode, the first drain electrode, the second source electrode, the second drain electrode, the first TFT channel region and the second TFT channel region are formed by another patterning process with a another normal mask.

The second gate line 11b, the detecting line 14 and the second thin film transistor on the array substrate are provided to detect whether the first thin film transistor normally operates and the characteristics of the first thin film transistor in a simple way. During the detection on the TFT-LCD array substrate, a turn-on ("ON") or turn-off ("OFF") voltage is supplied to the first gate line and/or the second gate line, and by detecting whether the data line is electrically connected with the detecting line for each pixel unit, it can be determined whether short circuit occurs in the thin film transistors or whether the thin film transistors cannot normally turned on. The details of the detection process will be described in the method of detecting the TFT-LCD array substrate according to the embodiment. In addition, by providing the second gate line 11b, the detecting line 14 and the second thin film transistor on the array substrate, the defect of image sticking can be effectively eliminated as well. During the operation process of the TFT-LCD, a release path for the residual charges on the pixel electrode can be formed when the detecting line is electrically connected with the pixel electrode; in addition, the phenomenon that the liquid crystal molecules are polarized can be eliminated when a reverse overdrive voltage is supplied to the pixel electrode through the detecting line, or a black image frame can be inserted between two adjacent frames when a black image control voltage is supplied to the pixel electrode through the detecting line. Thereby, the image sticking defect can be effectively eliminated and the display quality can be improved. The details of the driving process will be described in the method of driving the TFT-LCD array substrate according to the embodiment.

On the TFT-LCD array substrate according to the embodiment, the second line, the detecting line and the second thin film transistor are provided in addition to the first date line, the pixel electrode and the first thin film transistor. In this way, whether the thin film transistor normally operates or not can be examined and the characteristics of the thin film transistor can be detected in an electric way, the image sticking defect can be effectively eliminated, and thus the yield can be improved and the manufacture cost can be reduced.

In addition, according to another embodiment, a method of manufacturing a TFT-LCD array substrate comprises:

Step 11 of forming a first gate line, a second gate line, a first gate electrode and a second gate electrode by a patterning process, wherein the first gate electrode is connected with the first gate line, and the second gate electrode is connected with the second gate line;

Step 12 of forming a first active layer, a second active layer, a data line, a first source electrode, a first drain electrode, a second source electrode and a second drain electrode by a patterning process;

Step 13 of forming a first via hole, a second via hole and a third via hole by a patterning process, wherein the first via hole is provided at the first drain electrode, the second via hole is provided at the second drain electrode and the third via hole is provided at the second source electrode; and Step 14 of forming a pixel electrode and a detecting line by a patterning process, wherein the pixel electrode is connected with the first drain electrode through the first via hole and connected with the second drain electrode through the second via hole, and the detecting line is connected with the second source electrode through the third via hole.

The manufacture process of the TFT-LCD array substrate according to this embodiment has been described with reference to FIG. 4 to FIG. 12, and the details thereof is omitted here for simplicity.

In the embodiment shown in FIG. 1, the detecting line 14 is formed above the second gate line 11b and parallel to the second gate line 11b; however, in another embodiment, the detecting line 14 can be formed above the data line 12 and parallel to the data line 12.

In addition, according to still another embodiment, a method of detecting the TFT-LCD array substrate comprises:

Step 21 of supplying an ON or OFF voltage to the first gate line and/or the second gate line; and Step 22 of determining whether the thin film transistors normally operate according to connection state between the data line and the detecting line.

The method of detecting the TFT-LCD array substrate may be performed as follows.

(1) An OFF voltage is supplied to both the first gate line and the second gate line, and the connection state between the data line and the detecting line is detected. If the data line and the detecting line are electrically connected, it can be determined that short circuit between source and drain electrodes occurs in both the first thin film transistor and the second thin film transistor.

(2) An ON voltage is supplied to the first gate line, an OFF voltage is supplied to the second gate line, and the connection state between the data line and the detecting line is detected. If the data line and the detecting are electrically connected, it can be determined that short circuit between source and drain electrodes occurs in the second thin film transistor.

(3) An OFF voltage is supplied to the first gate line, an ON voltage is supplied to the second gate line, and the connection state between the data line and the detecting line is detected. If the data line and the detecting line are electrically connected, it can be determined that short circuit between source and drain electrodes occurs in the first thin film transistor.

(4) An ON voltage is supplied to both the first gate line and the second gate line, and the connection state between the data line and the detecting line is detected. If the data line and the detecting line are not electrically connected, it can be determined that at least one of the first and second thin film transistors cannot be normally turned on. In practice, instead of supplying an OFF voltage, it is feasible that no voltage signal is supplied.

Specifically, an example of the method of detecting the TFT-LCD array substrate may comprises the following steps.

Step 31 of supplying an OFF voltage to the first gate line and the second gate line, and detecting the connection state between the data line and the detecting line, wherein if the data line and the detecting line are electrically connected, it can be determined that short circuit between source and drain electrodes occurs in both the first thin film transistor and the second thin film transistor, and if the data line and the detecting line are not electrically connected, Step 32 is performed;

Step 32 of supplying an ON voltage to the first gate line, supplying an OFF voltage to the second gate line, and detecting the connection state between the data line and the detecting line, wherein if the data line and the detecting are electrically connected, it can be determined that short circuit between source and drain electrodes occurs in the second thin film transistor, and if the data line and the detecting line are not electrically connected, Step 33 is performed;

Step 33 of supplying an OFF voltage to the first gate line, supplying an ON voltage to the second gate line, and detecting the connection state between the data line and the detecting line, wherein if the data line and the detecting line are electrically connected, it can be determined that short circuit between source and drain electrodes occurs in the first thin film transistor, and if the data line and the detecting line are not electrically connected, Step 34 is performed; and Step 34 of supplying an ON voltage to the first gate line and the second gate line, and detecting the connection state between the data line and the detecting line, wherein if the data line and the detecting line are not electrically connected, it can be determined that at least one of the first and second thin film transistors cannot be normally turned on, and if the data line and the detecting line are electrically connected, it can be determined that the first thin film transistor and the second thin film transistor can be normally turned on and the detection process is ended.

In the above detection process, in the case that short circuit occurs in the first and/or second thin film transistors or it is determined that at least one of the first and second thin film transistor cannot be normally turned on, a further detection and repair process is performed so that the above malfunctions can be eliminated. In addition, it should be noted that, the above steps may be performed in other different orders.

Figure 13:
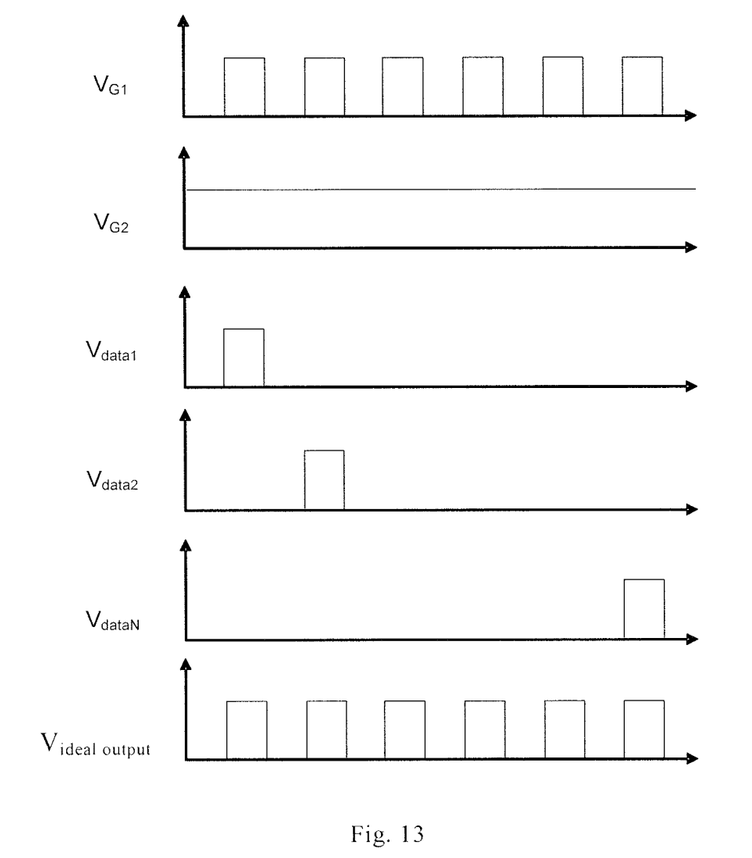
FIG. 13 is a schematic view showing the detecting signals in the method of detecting the TFT-LCD array substrate according to the embodiment.

FIG. 13 is a schematic view showing the detecting signals in the method of detecting the TFT-LCD array substrate according to the embodiment. During the detection process of the TFT-LCD array substrate, a clock pulse signal is sequentially supplied to the data lines, the output signal of each detecting line is detected, and in this way, whether the thin film transistors normally operates or not can be determined according to the output signals. For example, Step 34 can be performed as follows. A first driving signal $V_{G1}$ is supplied to the first gate line of a pixel row, and a second driving signal $V_{G2}$ is supplied to the second gate line of the pixel row. The first driving signal $V_{G1}$ is a pulse signal, that is, the first thin film transistor is turned on when the first driving signal $V_{G1}$ is in a high level and the first thin film transistor is turned off when the first driving signal $V_{G1}$ is in a low level. The second driving signal $V_{G2}$ is a constant high level signal, that is, the second thin film transistor is turned on always. Data signals $V_{data1}, V_{data2} \ldots V_{dataN}$ are sequentially supplied to the pixel electrodes in the pixel row. When the first thin film transistors and the second thin film transistors in all the pixels in the pixel row normally operate, ideal output signal $V_{ideal\ output}$ can be detected from the detecting line, as shown in FIG. 13. If certain pulse is absent or the waveform of the output signal is different from the corresponding one in the $V_{ideal\ output}$, it can be determined that at least one of the first and second thin film transistors in the corresponding pixel cannot be normally turned on. In practice, the detection can be performed in a line-by-line manner or in a full-screen manner depending on the detecting apparatus. Since the output signals from the detecting lines in pixel rows do not interfere with each other, time can be saved and efficiency can be improved if the detection is performed in a full-screen manner.

In addition, according to the method of detecting the TFT-LCD array substrate, the characteristics of the thin film transistors can be further detected. The process of detecting the characteristics of the thin film transistors is described as follows. A high level signal is supplied to the second gate line so that the second thin film transistor is turned on all the while, a continuously varying voltage is supplied to the first gate line and a constant DC voltage is supplied to the data line so that the threshold voltage, the turn-on voltage, the turn-on current and the like of the first thin film transistor can be recorded. Thus the process of detecting the characteristics of the first thin film transistor is accomplished. Compared with a conventional method in which a probe directly contacts the pixel electrode and detection is necessarily performed in a microscope level, the characteristics of the thin film transistor can be detected in a more simple way according to this embodiment.

In addition, according to this embodiment, whether the thin film transistor normally operates or not can be examined and the characteristics of the thin film transistor can be detected in an electric way. Compared with the conventional simulation cell method, the method of detecting the TFT-LCD array substrate according to this embodiment is simple and effective, and thus has a wide application prospect.

According to still another embodiment of the invention, a method of driving the TFT-LCD array substrate comprises: supplying an ON signal to the second gate line before an ON signal is supplied to the first gate line so that the detecting line is electrically connected with the pixel electrode and thus the image sticking defect is eliminated. Before each frame is displayed, an ON signal is supplied to the second gate line so that the second thin film transistors are turned on and the detecting lines are connected with the pixel electrodes, and in this case, the detecting lines can be used as the release path for the residual charges accumulated on the pixel electrodes and the phenomenon that the liquid crystal molecules are polarized can be eliminated by supplying a reverse overdrive voltage to the pixel electrode through the detecting lines. In addition, before each frame is displayed, an ON signal is supplied to the second gate lines so that the second thin film transistors are turned on and the detecting lines are connected with the pixel electrodes, and in this case, a black image frame can be inserted between two adjacent frames by supplying a black image control voltage to the pixel electrode through the detecting line. Therefore, the image sticking defect can be eliminated and the display quality can be improved.

The detecting lines may be connected with the common electrode to release the residual charges on the pixel electrode, or the detecting lines may be connected with the data driver to supply the reverse overdrive voltage or the black image control voltage to the pixel electrode.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. An array substrate, comprising:
   a first gate line and a second gate line parallel to each other;
   a data line, and
   a detecting line,
   wherein the first gate line and the second gate line intersect with the data line to define a pixel region, and a pixel electrode, a first thin film transistor and a second thin film transistor are provided in the pixel region;
   wherein the first thin film transistor is connected with the first gate line, the data line and the pixel electrode, and the data line is capable of being electrically connected with the pixel electrode under control of the first gate line;
   wherein the second thin film transistor is connected with the second gate line, the detecting line and the pixel electrode, and the pixel electrode is capable of being electrically connected with the detecting line under control of the second gate line;

wherein the array substrate further comprises a passivation layer covering the first gate line, the second gate line, the first thin film transistor, the second thin film transistor and the data line;

wherein the detecting line and the pixel electrode are provided on the passivation layer;

wherein the first thin film transistor comprises a first gate electrode, a first source electrode and a first drain electrode, the second thin film transistor comprises a second gate electrode, a second source electrode and a second drain electrode, the first source electrode is connected with the data line, and the second source electrode is connected with the detecting line; and wherein the first gate electrode is directly connected with the first gate line, the second gate electrode is directly connected with the second gate line, the first drain electrode and the second drain electrode are directly connected with the same pixel electrode.

2. The array substrate according to claim 1, wherein the detecting line is provided above the second gate line.

3. The array substrate according to claim 1, wherein the detecting line is provided above the data line.

4. A method of detecting the array substrate according to claim 1, comprising:
supplying an ON or OFF voltage to the first gate line and/or the second gate line; and
determining whether the thin film transistors normally operate according to connection state between the data line and the detecting line.

5. The method of detecting the array substrate according to claim 4, wherein an OFF voltage is supplied to the first gate line and the second gate line, and the connection state between the data line and the detecting line is detected, and
wherein if the data line and the detecting line are electrically connected, it is determined that short circuit between source and drain electrodes occurs in both the first thin film transistor and the second thin film transistor.

6. The method of detecting the array substrate according to claim 4, wherein an ON voltage is supplied to the first gate line, an OFF voltage is supplied to the second gate line, and the connection state between the data line and the detecting line is detected, and
wherein if the data line and the detecting are electrically connected, it is determined that short circuit between source and drain electrodes occurs in the second thin film transistor.

7. The method of detecting the array substrate according to claim 4, wherein an OFF voltage is supplied to the first gate line, an ON voltage is supplied to the second gate line, and the connection state between the data line and the detecting line is detected, and
wherein if the data line and the detecting line are electrically connected, it is determined that short circuit between source and drain electrodes occurs in the first thin film transistor.

8. The method of detecting the array substrate according to claim 4, wherein an ON voltage is supplied to the first gate line and the second gate line, and the connection state between the data line and the detecting line is detected, and
wherein if the data line and the detecting line are not electrically connected, it is determined that at least one of the first and second thin film transistors cannot be normally turned on.

9. The method of detecting the array substrate according to claim 4, wherein the method further comprises a step of detecting the characteristics of the thin film transistor, in which a high level signal is supplied to the second gate line so that the second thin film transistor is turned on all the while, a continuously varying voltage is supplied to the first gate line, a constant DC voltage is supplied to the data line, and thereby parameters representing the characteristics of the thin film transistor are obtained.

10. A method of driving the array substrate according to claim 1, wherein an ON signal is supplied to the second gate line before an ON signal is supplied to the first gate line so that the detecting line is electrically connected with the pixel electrode to eliminate image sticking defect.

11. The method of driving the array substrate according to claim 10, wherein when eliminating image sticking defect, the second thin film transistor is turned on so that the detecting line is electrically connected with the pixel electrode, and the detecting line is used as a release path for the residual charges on the pixel electrode.

12. The method of driving the array substrate according to claim 10, wherein when eliminating image sticking defect, the second thin film transistor is turned on so that the detecting line is electrically connected with the pixel electrode, and a reverse overdrive voltage is supplied to the pixel electrode through the detecting line.

13. The method of driving the array substrate according to claim 10, wherein when eliminating image sticking defect, the second thin film transistor is turned on so that the detecting line is electrically connected with the pixel electrode, and a black image frame is inserted between two adjacent frames by supplying a black image control voltage to the pixel electrode through the detecting line.

14. A method of manufacturing an array substrate, comprising:
forming a first gate line, a second gate line, a first gate electrode and a second gate electrode, wherein the first gate electrode is directly connected with the first gate line, and the second gate electrode is directly connected with the second gate line;
forming a first active layer, a second active layer, a data line, a first source electrode, a first drain electrode, a second source electrode and a second drain electrode;
forming a passivation layer covering the first gate line, the second gate line, the first gate electrode, the second gate electrode, the first active layer, the second active layer, the data line, the first source electrode, the first drain electrode, the second source electrode and the second drain electrode;
forming a first via hole, a second via hole and a third via hole in the passivation layer, wherein the first via hole is provided at the first drain electrode, the second via hole is provided at the second drain electrode and the third via hole is provided at the second source electrode; and
forming a pixel electrode and a detecting line, wherein the pixel electrode is connected with the first drain electrode through the first via hole and connected with the second drain electrode through the second via hole so that the first drain electrode and the second drain electrode are directly connected with the same pixel electrode, and the detecting line is connected with the second source electrode through the third via hole,
wherein the detecting line and the pixel electrode are provided on the passivation layer.

15. The method according to claim 14, wherein the detecting line is provided above the data line or the second gate line.

* * * * *